Patented Oct. 4, 1932

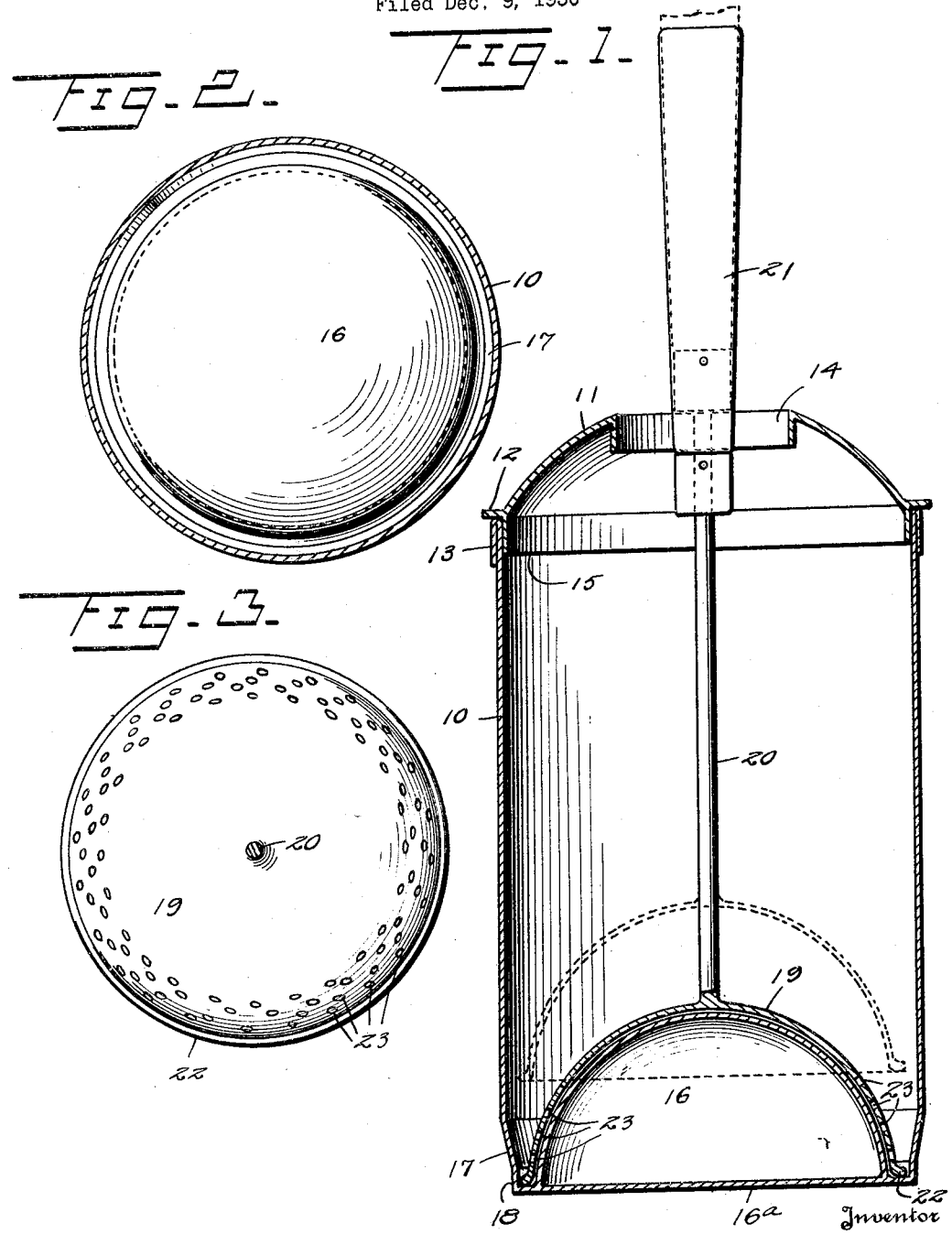

1,881,361

UNITED STATES PATENT OFFICE

THOMAS A. KILLMAN, OF NASHVILLE, TENNESSEE

EGG BEATER

Application filed December 9, 1930. Serial No. 501,092.

This invention relates to agitators, beaters, or churns for beating up eggs, milk, cream and other liquids and particularly to beaters of that character in which the beater is reciprocated longitudinally of a container.

In agitators of the character above described, it is usual to use a flat dash which is perforated and which is reciprocated within the container and which approximately fits the container. Such a dasher does not carry down with it into the liquid or semi-liquid any air to form bubbles and thus lighten the material and the general object of my invention is to provide a beater or agitator in which the dasher is so formed that it will carry down with it a quantity of air to the bottom of the vessel and will then discharge this air upward into the liquid above the dasher, this being necessary for the reason that the beating of eggs, cream and the like consists of incorporating air into the liquid in the form of small bubbles which forms a froth and increases greatly the bulk of the liquid.

A further object is to so form the dasher and container that when the dasher is forced to the bottom thereof, a certain amount of air will be trapped beneath the dasher and will be discharged upward through the liquid in the container above the dasher, and another object is to so form the dasher and container that when the dasher is carried upward, the bubbles formed by the downward movement of the dasher will not be broken up.

Other objects will appear in the course of the following description.

My invention is illustrated in the accompanying drawing, wherein:—

Figure 1 is a vertical sectional view through a beater or agitator constructed in accordance with my invention;

Figure 2 is a transverse section of the container;

Figure 3 is a top plan view of the dasher.

Referring to the drawing, 10 designates a cylindrical container having a cover 11 provided with a flange 12 which, when the cover is in place, fits closely upon the overturned rim 13 at the top of the container. This cover 11 is provided with a central aperture defined by a downwardly extending annular flange 14, this aperture being relatively large. The cover 11 has a flange 15 which fits down tightly within the rim of the container. The bottom of the container is formed with a centrally disposed spherical dome 16 less in diameter than the bottom of the container, the body of the container being joined to the bottom by a centrally and downwardly inclined portion 17 and a short vertical portion 18.

Operating within the container is a dasher designated generally 19 which is concavo convex or hemispherical in form and has a centrally disposed shank 20 extending up therefrom to which a handle 21 is pinned. This handle 21, of course, has a diameter much less than the diameter of the wall 14 defining the central opening of the cover. The lower end of the dash has a diameter closely approximating the internal diameter of the portion 18 and, therefore, less in diameter than the diameter of the body. It will be noted that the inclined portion 17 of the container extends downward and inward for a distance and that then it joins the portion 16 by a short vertical portion 18 having an internal diameter approximately equal to the external diameter of the lower end of the dash. This lower end is preferably slightly thickened and flared as at 22. There is thus just sufficient space between the lower end of the spherical portion 16 and the portion 18 to receive the lower end of the dash. Above the lower end of the dash, the dash is formed with a plurality of rows of openings 23, four rows of openings being used, the openings being preferably disposed in staggered relation to each other. I do not wish to be limited to the number of rows of openings, nor to their relation as illustrated except that the central portion of the dash must be left imperforate. The dasher is used in an obvious manner by reciprocating it vertically within the container.

The reason for reducing the diameter of the cup or container 10 at the bottom is as follows:—In order for this device to work properly, I have found that the external diameter of the dasher must be appreciably though slightly smaller than the interior diameter of the vessel so as to form an annular space around the dasher through which the bubbles formed on a down stroke of the dasher can pass on an upward stroke of the dasher without having to pass back through the perforations 23 which would destroy these bubbles. This would be the case were the dasher made to fit closely within the receptacle.

I have also found, however, that if the receptacle is made much larger than the dash, that there is an annular space at the bottom of the receptacle formed between the wall of the receptacle and the external edge of the semispherical bottom. Into this annular space, the liquid contents of the receptacle will gravitate so that it will lie outside of the diameter of the dasher which, therefore, cannot come in contact with all liquid in order to beat it up. To avoid these objections and to secure, therefore, a maximum effect of the dasher, I reduce the diameter of the lower end of the receptacle at its extreme lower end to the size of the dasher. This forces the liquid in toward the center of the receptacle and entirely under the dasher so that the dasher can come in contact with all liquid even though there be but a small quantity of liquid in the receptacle. In making the receptacle of uniform diameter except at its extreme lower end, a proper and sufficient space is left between the periphery of the dasher and the receptacle as will permit the flow of liquid and particularly to permit the flow of air bubbles downward around the dasher as the dasher is drawn upward. If this space between the periphery of the dasher and vessel is too great, however, too much of the light will pass around the dasher and will not be aerated.

In order to form bubbles on the down stroke, the dasher is made with its under face concave, as stated, and with several rows of perforations 23. The imperforate area in the center of the dasher forms an air pocket as previously stated, which fills with air when the dasher is drawn up out of the liquid on the upstroke. Upon the down stroke of the dasher into the receptacle and owing to the fact that the dasher fits snugly over the spherical bottom 16, this pocket of air is forced downward and out through the perforations 23 in the dasher which is at this time under the surface of the liquid, thus causing the air to form bubbles in the liquid. Upon a reverse movement of the dash, however, as before explained, the liquid will pass around the dasher and the air bubbles will not, therefore, be broken up by passing through the perforations 23.

A beater constructed in accordance with my invention has been found very effective in action for the reasons above stated.

While I have illustrated the spherical bottom 16 as being formed over a false bottom 16ª, which extends straight across the bottom of the receptacle, I do not wish to be limited to this construction, as it is obvious that the false bottom 16ª might be left off without in any way changing the operation of the device.

I claim:—

1. A beater of the character described, comprising a receptacle having a uniform cross sectional area except at its lower portion, the lower end of the receptacle being tapered downward and centrally and the bottom of the receptacle having an upwardly projecting semispherical portion, a concavo-convex dasher disposed within the receptacle and having its under face concave and adapted to fit entirely over the semispherical portion of the receptacle when the dasher is lowered, the dasher having perforations adjacent its lower end, the central portion of the dasher being imperforate, the diameter of the dasher being substantially the same as the diameter of the extreme lower end of the receptacle but slightly less than the diameter of the body of the receptacle.

2. A beater of the character described, comprising a receptacle cylindrical for substantially its entire length except at its lower portion, the lower end of the receptacle being tapered inward, the bottom of the receptacle having an upwardly projecting semispherical portion, a concavo-convex dasher disposed within the receptacle, the dasher having its under face concave and adapted to fit entirely over the semispherical bottom when the dasher is fully lowered, the dasher having perforations adjacent its lower end, the central portion of the dasher being imperforate, the diameter of the dasher being substantially the same as the diameter of the extreme lower end of the receptacle but slightly less than the diameter of the body of the receptacle above the tapered portion.

In testimony whereof I affix my signature.

THOMAS A. KILLMAN.